(12) United States Patent
Cuevas Ramirez et al.

(10) Patent No.: US 10,567,937 B2
(45) Date of Patent: Feb. 18, 2020

(54) MOBILE INFORMATION PROCESSING

(71) Applicant: BRITISH TELECOMMUNICATIONS PUBLIC LIMITED COMPANY, London (GB)

(72) Inventors: Maria Cuevas Ramirez, Madrid (ES); Jonathan Hart, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/767,800

(22) PCT Filed: Oct. 5, 2016

(86) PCT No.: PCT/EP2016/073800
§ 371 (c)(1),
(2) Date: Apr. 12, 2018

(87) PCT Pub. No.: WO2017/071924
PCT Pub. Date: May 4, 2017

(65) Prior Publication Data
US 2018/0310150 A1    Oct. 25, 2018

(30) Foreign Application Priority Data

Oct. 30, 2015  (EP) .................................... 15192414

(51) Int. Cl.
*H04W 4/20* (2018.01)
*H04W 4/60* (2018.01)
*G06F 8/61* (2018.01)

(52) U.S. Cl.
CPC ................ *H04W 4/60* (2018.02); *G06F 8/61* (2013.01); *G06F 8/62* (2013.01); *H04W 4/20* (2013.01)

(58) Field of Classification Search
CPC .. H04W 4/60; H04W 4/20; G06F 8/61; G06F 8/62
See application file for complete search history.

(56) References Cited

U.S. PATENT DOCUMENTS

2006/0223503 A1   10/2006  Muhonen et al.
2008/0141244 A1*   6/2008  Kelley .................... G06F 8/61
                                                      717/178
2013/0265868 A1   10/2013  Berg et al.
(Continued)

OTHER PUBLICATIONS

International Search Report for PCT/EP2016/073800, dated Feb. 15, 2017, 4 pages.
(Continued)

*Primary Examiner* — Chuong A Ngo
(74) *Attorney, Agent, or Firm* — Nixon & Vanderhye PC

(57) ABSTRACT

An application deployment manager 8 associated with an associated Mobile Edge Computing server receives a notification (step 222) of a newly-attached terminal, and queries a database 60 (step 223) to identify any computing applications the terminal is associated with, and interrogates an application platform 12 and an update record 72 to determine whether the current version of each required service is currently hosted on the platform 12 (steps 225, 250). The application deployment manager 8 then retrieves any programme data not already hosted on the application management system (step 227) for installation ready for use by the terminal 2.

13 Claims, 4 Drawing Sheets

(56) References Cited

U.S. PATENT DOCUMENTS

2014/0022985 A1    1/2014  Kalmbach et al.
2015/0154042 A1*  6/2015  Katayama ........... G06F 9/45533
                                                              718/1

OTHER PUBLICATIONS

Combined Search and Examination Report dated Mar. 31, 2016 issued in GB Application No. GB1519217.2 (7 pgs.).
Yu Xiao et al., "Lowering the Barriers to Large-Scale Mobile Crowdsensing", HotMobile '13 Proceedings of the 14$^{th}$ Workshop on Mobile Computing Systems and Applications, Jekyll Island, Georgia, Feb. 26-27, 2013 (6 pgs.).
Michael Till Beck et al., "Me-VoLTE: Network Functions for Energy-Efficient Video Transcoding at the Mobile Edge", 2015 18th International Conference on Intelligence in Next Generation Networks, 2015 IEEE (7 pgs.).
Smarter wireless networks, IBM Software Telecommunications, Thought Leadership White Paper, IBM Corporation, Armonk, NY, Feb. 2013 (8 pgs.).
Office Action dated Mar. 31, 2016 issued in UK Application No. GB1519217.2 (8 pgs.).
Response to Office Action dated Mar. 31, 2016 issued in UK Application No. GB1519217.2 (10 pgs.).
Office Action dated Jan. 15, 2019 issued in UK Application No. GB1519217.2 (4 pgs.).
Response to Office Action dated Jan. 15, 2019 issued in UK Application No. GB1519217.2 (13 pgs.).

* cited by examiner

MOBILE INFORMATION PROCESSING

This application is the U.S. national phase of International Application No. PCT/EP2016/073800 filed 5 Oct. 2016, which designated the U.S. and claims priority to EP Patent Application No. 15192414.9 filed 30 Oct. 2015, the entire contents of each of which are hereby incorporated by reference.

BACKGROUND AND SUMMARY

This invention relates to information processing and in particular to the use of distributed processing power by users of mobile communications terminals.

Mobile Edge Computing (MEC) is a concept which introduces general purpose processing and cloud-computing capabilities into mobile base stations so as to be in close proximity to the mobile subscribers which are to use those capabilities. These capabilities can provide application developers and content providers with a service environment with very low latency and high-bandwidth. It also offers direct access to real-time radio network information (such as subscriber location, cell load, etc.) that can be used by applications and services to provide context-related services to differentiate the mobile broadband experience. United States Patent Application US2013/265868 describes how the services can be provided by hosting edge applications which process data generated in the base stations.

A new standardisation group within ETSI has been set up to create a standardised, open environment which will allow the efficient integration of generic applications from vendors, service providers, and third-parties across multi-vendor MEC platforms and allow for the rapid transfer of applications (which may occur on the fly) between MEC servers, providing the freedom to optimize, without constraints, the location and required resources of the virtual appliances. This will allow applications to be readily rolled out to multiple servers.

Moving applications and content to the edge of the Mobile Network has a number of advantages for both operators and end users. These include improvements in mobile users' Quality of Experience, by reducing latency, improving quality of service and providing customised services. It can also improve the efficiency of the infrastructure's efficiency, with more intelligent and optimised networks, and reduce the volume of traffic to the core network.

However, it would be a major task to ensure that all possible virtual appliances are permanently available on all servers. Not only would this require extensive memory capacity to be available, but the communications overhead to maintain all applications up to date on all servers would be significant. In particular, some applications will see little use because they are of a very specialised nature, or because there are other applications which perform similar functions and are more popular. There will be other applications whose use may be sporadic, or seasonal, or geographically localised, for which data storage and communications overhead for updating at all local nodes throughout the network may not be justified.

United States Patent application US2014/022985 resolves this by redirecting service requests to cells already hosting the required applications. However, such an arrangement can result in delays in processing as data and results need to be exchanged between cells. United States Patent application US2008/141244 presents another system, in which a user device initiates the downloading of an application on its serving cell when it requires the application to be run. However, this can result in a delay in running the application as the base station then has to retrieve and install the application required by the user.

The present invention involves the dynamic instantiation of a set of applications on a per user basis.

According to the invention, there is provided a method of connecting mobile terminals to a mobile communications network through an interface server, the interface server being capable of installing computing applications for co-operation with mobile terminals attached to the interface server, wherein the server interrogates a database to identify computing applications that attached terminals require to operate and, if the server does not already have the required computing applications installed, downloads programme information from a programme store to allow the required capability to be installed.

Preferably, information about a user's subscription to a particular set of services is held on a central database and is queried by the interface server when attachment takes place. It may instead be stored as a user profile on the terminal itself, to be queried by the interface server when first attached to a given base station.

When a subscriber initially subscribes to a service, the subscription service transmits the information into the central database as to which users have subscribed to that particular service.

The invention enables a Mobile Network Operator to dynamically install a set of applications, at the edge of the network, upon attachment or service requests from a particular subscriber. The key advantage is that usage of computing resources deployed at the edge of the networks can be optimised by only deploying applications that are likely to be used by subscribers attached to a particular cell or group of cells, rather than applications being permanently installed unnecessarily when unlikely to be used. The dynamic installation of applications in a server only when required by a terminal connecting to the server also reduces the communications overhead.

The method can include an interaction with the programme store when a terminal requires an application already stored by the server to determine whether a version stored by the server is current and, if it is not, downloading the latest version from the programme store to replace it. To economise on memory, applications may be deleted from the server if they have not been used for a predetermined period: the criteria for deletion will depend on the balance between the costs of storage, the cost of communications to download the application should it be required again, and the likelihood that the stored version is still current.

The invention also extends to an interface server for connecting mobile terminals to a mobile communications network, the interface server having an application platform capable of supporting computing applications for co-operation with mobile terminals operationally attached to the interface server, and having an application deployment management system having means for interrogating a database to identify computing applications that attached terminals require the platform to support, an application platform interface for interacting with the application platform to identify applications installed on the platform, and an accession interface to download application programme information from a programme store to install the required capability on the platform if it is not already present.

BRIEF DESCRIPTION OF THE DRAWINGS

An embodiment of the invention will now be described, by way of example, with reference to the accompanying drawings, in which.

The steps in the process are indicated by three-digit numbers, and physical or functional elements by one and two digit numbers.

DETAILED DESCRIPTION OF PRESENT EXAMPLE EMBODIMENTS

Figure 1:
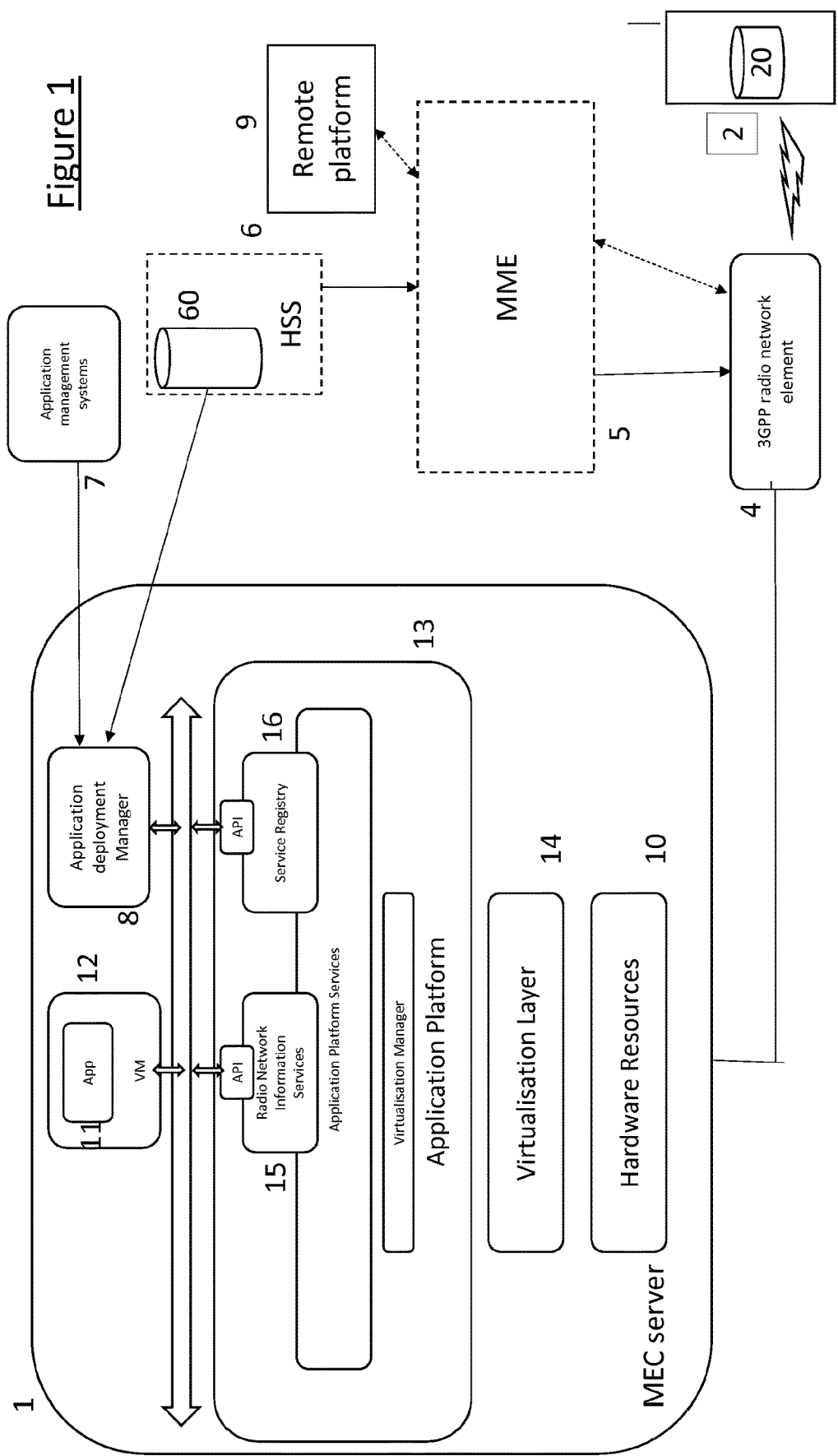
FIG. 1 is a schematic representation of the components of a network which co-operate to perform the invention.

Referring first to FIG. 1, a mobile edge computing server 1 is depicted, co-operating with a mobile terminal device 2 through a wireless connection 3 to a radio access point (base station) 4. As is conventional, when a terminal 2 connects to the network or effects a handover it interacts, through the radio access node, with a mobile management entity (MME) 5 to establish a connection with the network. The MME exchanges data with a home subscriber server (HSS) 6 to confirm the identity of the terminal is valid and to update location registers to allow incoming traffic to be directed to it.

The mobile edge computing server 1 provides a resource for applications that are hosted on the network for the use of terminals. Provision of the application in the network reduces the amount of memory and computing capacity required for the terminals themselves, and allows more efficient use of these resources since they can be shared between several terminals. However, as has been discussed, hosting the application at a location remote from the access point introduces further problems, particularly of latency and of capacity on the distribution network. For many applications, it is advantageous to host the application in a server 1 topologically close to the access point 3 through which the terminal 2 is communicating—this is known as mobile edge computing (MEC).

Typically a mobile edge server 1 is associated with a particular access point 4 or a group of such access points. The mobile edge server is typically embodied in software running on general purpose hardware 10. The functional elements include the application software 11 which is loaded on a virtual machine (VM) 12 and an application platform 13 on which is run the radio information service platform 15 needed to interface with a virtualisation layer 14 through which the terminal 2 interacts with the application.

Applications are downloaded to the application platform 13 from an application management system 7 by interaction with a service registry function 15. Conventionally, for any MEC 1 supporting this application, the application software, and any updates to that software, are delivered by a "push" mechanism initiated by the application management system 7. This can be inefficient, as all MEC servers have to have the data sent to them, and have storage space for it, whether or not any user is going to need it. Moreover, unless upgrades are very frequent, there will be times when a user terminal hands over from a first server running the application to another server running an earlier or later version, or which has not yet uploaded the application in the first place. In such situations the user may experience failure of the application during the course of a session.

As depicted in this embodiment, these difficulties are mitigated by the provision in the MEC 1 of an application deployment manager 8 which responds to connection of a user terminal 2 to an access point 4 associated with the MEC 1 by interrogating a database 60 in the HSS 6 associated with the user terminal 2, or data 20 stored in the terminal itself, to determine whether the user terminal requires operation of any applications. It then determines whether those applications are already running on the application platform 13. If there are any that are not already running on the platform, it retrieves programme data required to run such applications from the application management system 7.

Figure 2:
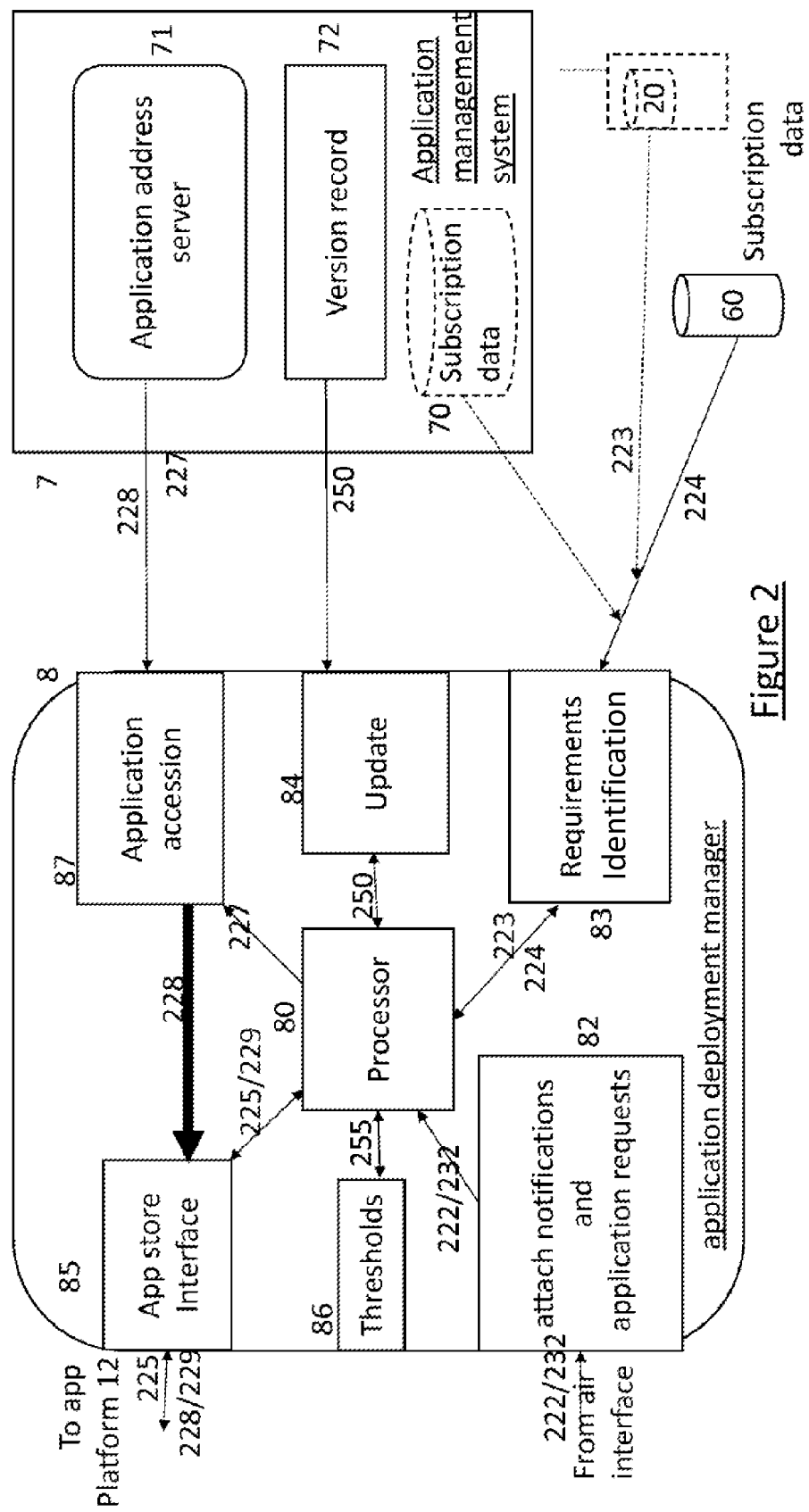
FIG. 2 is a schematic representation of the functional elements of an application deployment manager operating according to the invention

The functional elements of the application deployment manager 8 are depicted in more detail in FIG. 2. A central processor co-ordinates information flows from input/output ports 82, 83, 84, 85, 87. In internal store 86 maintains certain settings.

A network port 82 provides an interface with the radio network information services platform 15 which manages connections with any mobile terminals 2 currently connected to the MEC 1. An authentication port 83 is arranged to communicate with a store of data relating to the applications for which individual terminals have authority to use. This information may be maintained in the application management system 7, which would maintain a record 70 of which users have subscribed to the applications. Alternatively, the information may be available in the mobile device 2 itself, in the form of a password 20 or other authority to use the application. In the embodiment to be described in detail, the information is maintained in a store 60 in the home subscriber server 6 which also maintains subscriber data authorising attachment to the network 5.

An applications interface 85 provides a connection to the virtual machine 12. This is used to interrogate the virtual machine to identify what applications 11 are currently maintained on the machine, and to deliver any further applications that are to be loaded. An accession interface 87 interacts with the application management system 7 to obtain accession data for downloading applications from a store.

A further port 84 interfaces with a version-indexing system 72 of the application management system 7. A thresholding counter 86 manages iterative processes run by the processor 80.

Figure 3:
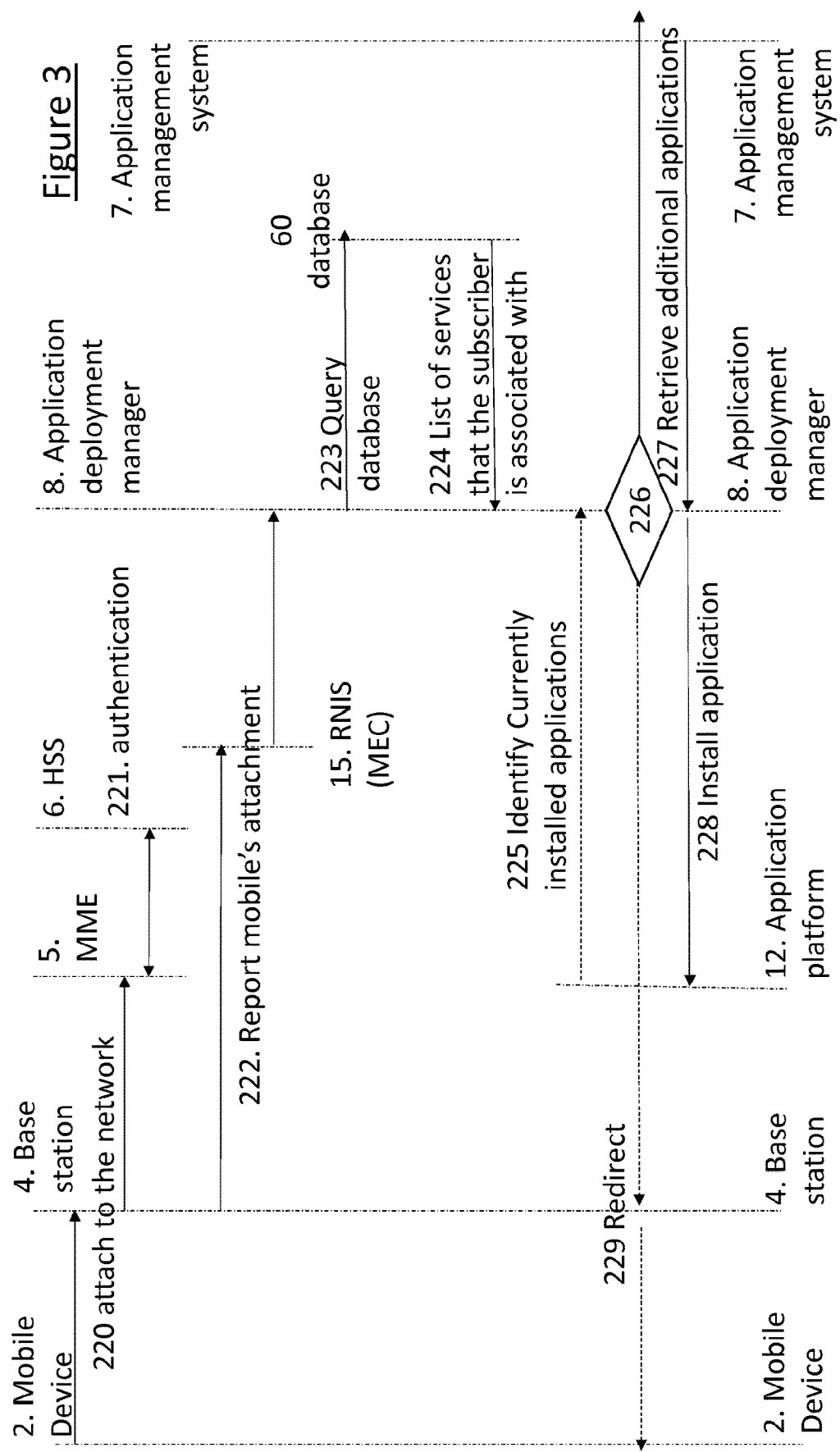
FIG. 3 is a flow chart illustrating the process by which the invention operates.

The operation of the application deployment manager 8 will be described in more detail with reference to the flow charts in FIG. 3 and FIG. 4. These differ in the detail of the operation that triggers the decision to download an application. On attachment or handover to the access point 4 (step 220) by the mobile terminal 2, a location update and authentication (step 221) is performed with the home subscriber server (HSS) 6 as is conventional. The access point 4 also transmits a report to the application services platform 15 in the mobile edge computing server 1. In existing MEC systems, the user terminal then has access to any applications 11 loaded on the virtual machine 12, subject to authentication from the service registry 16.

As has been explained above, current systems require any applications 11 that may be required by a mobile terminal 2 to already be available on the MEC server 1. The maintenance of a wide variety of possible applications, and the need to keep them updated, can be a major overhead for the network operator. The embodiment of the present invention mitigates this overhead by only uploading an application 11 to the MEC 1 when a requirement for that application is identified in respect of a user 2 connected to an access point 4 associated with the MEC.

According to this embodiment, the MEC server incorporates an application deployment manager system 8. The functional elements of this application deployment manager are depicted in FIG. 2, together with more detail of the application management system 7.

On attachment of a mobile terminal 2 to the access point associated with the MEC server 1, application deployment manager 8 receives a notification (step 222) through the network port 82. The application deployment manager 8 next queries a database 60 (step 223) to identify which services the subscriber is associated with, and receives a response (step 224). As depicted in FIG. 1, the database 60 can be associated with the Home Subscriber Server 6, which stores other persistent data relating to the terminal 2, (such as billing data, roaming permissions, etc). The term "persistent data" is used to distinguish from transient data that is only relevant to the current attachment to an access point 4. The information may alternatively be requested from data 70 stored in the application management system 7 relating to its subscribers, or from data 20 held by the subscriber terminal 2 itself, or from a combination of these sources.

Figure 4:
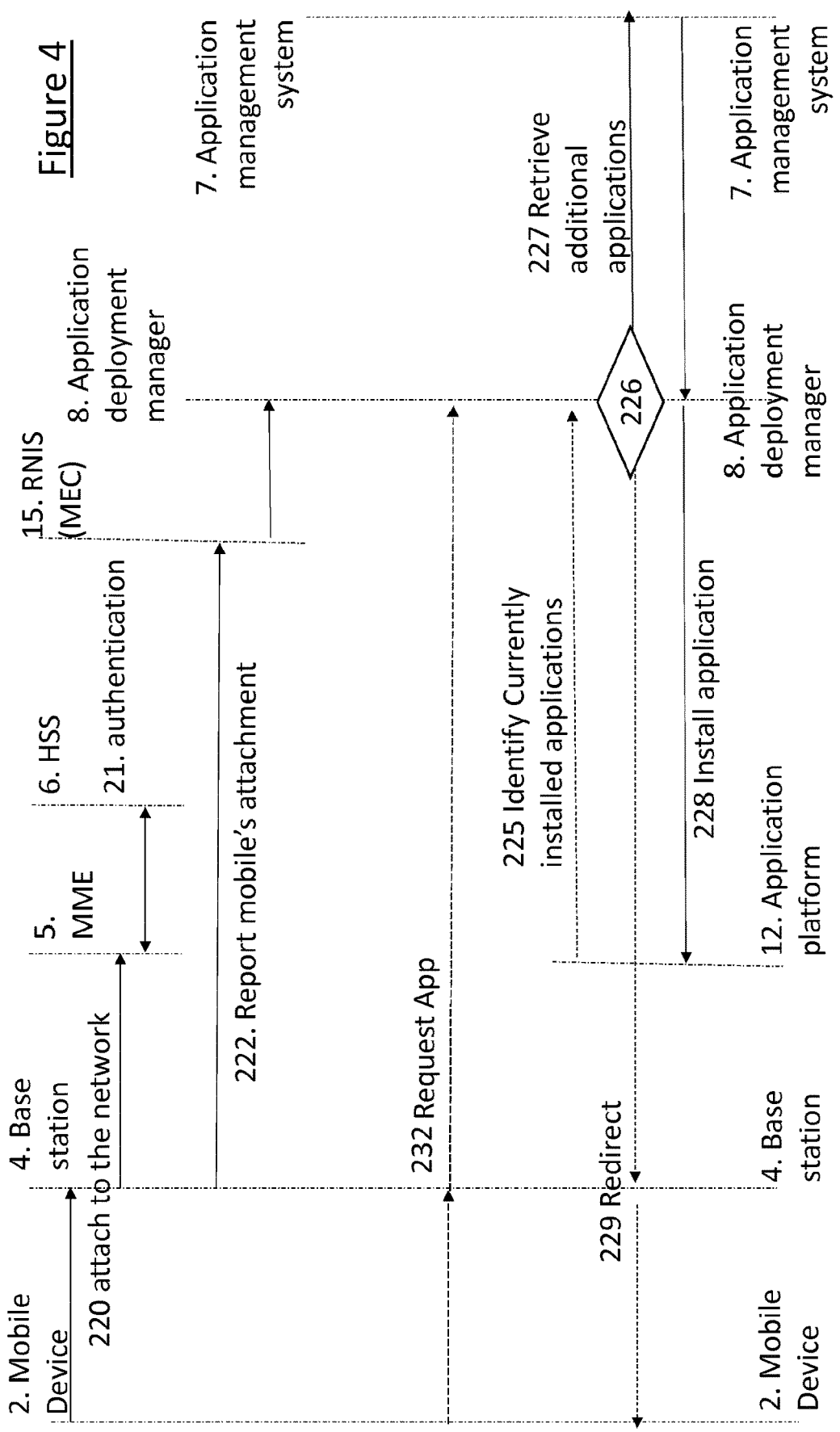
FIG. 4 is a flow chart illustrating an alternative process by which the invention operates.

In a further embodiment, depicted in FIG. 4, the process is initiated only if the user of the terminal 2 initiates use of the application (step 232).

Once the application deployment manager 8 has identified which services the subscriber 2 is associated with (step 224) or has requested (step 232), it then interrogates the application platform 12 through the applications interface 85 to determine whether the required services are currently hosted on the platform 12 (step 225). In the preferred embodiment it also determines what version of each application is currently hosted on the platform 12, and compares this with version data 72 held in the application management system 7 associated with the respective application (step 250).

If any of the services identified in the list associated with the subscriber (step 224), or the service requested by the subscriber (step 232) is absent from the list associated with the application platform (step 225), the application deployment manager 8 retrieves the necessary programme data from the application management system 7 by transmitting a request (step 227) through the accession interface 87. Typically the application management system 7 will incorporate a data server 71 providing address data (step 228) for the actual location from which the application itself can be downloaded by the application platform virtual machine 12. The retrieved programme 11 is then installed on the application platform 12 ready for use by the terminal 2.

In the preferred embodiment, the application deployment manager 8 interrogates a version record 72, through an interface 84 (step 250) to determine the current version of each application identified in the report 25 as being present in the application server 12. If the version number reported from the version record 72 (step 250) is later than that reported as present in the application platform 12 (step 225) a request for the application (in its latest version) is made (step 227), and when it is downloaded (228) it is used to overwrite the existing version in the application platform 12.

Once the application 11 has been uploaded to the MEC, it can of course be used by other terminals attaching to the access point 4, or any other access point associated with the MEC server 1.

Applications may be capable of instantiation at locations other than the "edge", and in some circumstances it may be appropriate to run the application from a location 9 other than a MEC server 1. In particular, there is a one-off time penalty involved in retrieval and installation of the application (steps 227, 228). To minimise the number of users who experience this delay, rarely-used applications may be instantiated at a more remote server 9, where they can be accessed by a larger number of users. The optimum trade-off between the greater latency of the application when in use and the saving in initial set-up time will depend on the nature of the application.

Where the application deployment manager 8 determines (step 226) that the application is not to be downloaded, an instruction is sent to the terminal 2 (step 229) providing an address 9 at which the application is instantiated so that the terminal 2 can access the application from that more remote location 9 through the network 5.

The application deployment manager 8 can be arranged such that the decision 26 made as to whether to download and install the application locally (steps 227, 228) or to direct the terminal to access it remotely (step 229) is dependent on the number of requests for the application have been made by users within a predetermined time period. These requests may be from a large number of individual users, or from a smaller number of users who each frequently connect through the MEC in question. These criteria are maintained by a thresholding system 86 which can, for example, count the number of requests processed by the processor 80 for a given application in a given time (step 255), to control the processor's decision process (step 226) to generate the appropriate output (steps 227, 229).

It may also take into account other factors, such as how frequently the application in question is modified relative to the number of accessions of that application.

The invention claimed is:

1. A method of connecting mobile terminals to a mobile communications network through an interface server, the interface server being capable of installing computing applications for co-operation with mobile terminals attached to the interface server, wherein, when a mobile terminal attaches to the network through the interface server, the interface server interrogates a database to identify associations between computing applications and the attached terminal and, if the server does not already have the computing applications associated with the attached terminal installed, downloads programme information from a programme store to allow the required applications to be installed.

2. A method according to claim 1, wherein the required applications are identified by interrogating a database in the terminal.

3. A method according to claim 1, wherein the required applications are identified by interrogating a network-based subscriber database.

4. A method according to claim 1, wherein when an association is identified between a terminal and an application already stored by the interface server, the interface server determines whether an updated version of the application is stored in the programme store, and downloads such an updated version if it exists.

5. A method according to claim 1, wherein applications are deleted from the server if they have not been accessed by users for a predetermined period.

6. A method according to claim 1, wherein the interface server downloads programme information from the programme store for applications for which the number of users have passed a predetermined threshold, and delivers accession information to allow remote access in response to requests for applications in respect of which the predetermined threshold has not been passed.

7. The method according to claim 1, wherein the database to be interrogated is a user profile stored on the mobile terminal.

8. The method according to claim 1, further comprising:
controlling the interface server to download programme information from the programme store for applications for which the number of users have passed a predetermined threshold; and
delivering accession information to allow remote access in response to requests for applications in respect of which the predetermined threshold has not been passed.

9. An interface server for connecting mobile terminals to a mobile communications network, the interface server having an application platform capable of supporting computing applications for co-operation with mobile terminals operationally attached to the interface server, having an attachment notification interface for identifying when a mobile terminal attaches to the network through the interface server, and having an application deployment management system having an authentication interface for interrogating a database for identifying associations between computing applications and the attached terminal when the attachment notification interface identifies that the mobile terminal attaches to the network through the interface server, an application platform interface for interacting with the application platform to identify applications installed on the platform, and an accession interface to download application programme information from a programme store to install computing applications associated with the attached terminal if they are not already present on the platform.

10. An interface server according to claim 9, wherein the database to be interrogated is a network based user profile.

11. An interface server according to claim 9, wherein the database to be interrogated is a user profile stored on the mobile terminal.

12. An interface server according to claim 9, having an update record interface for retrieving data identifying a current version of a requested application, and an application platform interface for identifying whether the so-identified current version corresponds to a version running on the application platform, and for controlling the application accession server to download application programme information relating to the current version from a programme store if no such correspondence is identified.

13. An interface server according to claim 9, having a thresholding system for controlling the interface server to download programme information from the programme store for applications for which the number of users have passed a predetermined threshold, and to deliver accession information to allow remote access in response to requests for applications in respect of which the predetermined threshold has not been passed.

* * * * *